United States Patent [19]

Overton

[11] 4,288,900

[45] Sep. 15, 1981

[54] PULLER TOOL

[75] Inventor: John S. Overton, Malvern, Pa.

[73] Assignee: FMC Corporation, San Jose, Calif.

[21] Appl. No.: 153,127

[22] Filed: May 27, 1980

[51] Int. Cl.[3] .............................................. B23P 19/04

[52] U.S. Cl. .......................................... 29/263; 29/266

[58] Field of Search ................. 29/244, 256, 258, 263, 29/264, 265, 266, 282, 234

[56] References Cited

U.S. PATENT DOCUMENTS 1,544,235 6/1925 Johnson et al. ........................ 29/263

3,007,241 11/1961 Gonzalez .............................. 29/266

*Primary Examiner*—Robert C. Watson

*Attorney, Agent, or Firm*—Jack W. Edwards; Richard B. Megley

[57] ABSTRACT

A tool for pulling a speed reduction unit from a drive shaft includes a puller plate that has outwardly extending flanges adapted to be placed in a groove formed in the internal surface of a tubular mounting sleeve of the reduction unit so that, when a threaded rod is threaded through the plate to extend into the sleeve and the inner end of the rod abuts the end of the drive shaft on which the tubular sleeve is mounted, continued threading of the rod into the mounting sleeve causes the plate to react against the wall of the groove and force the mounting sleeve and the reduction unit carried thereby off the drive shaft.

3 Claims, 4 Drawing Figures

FIG_2
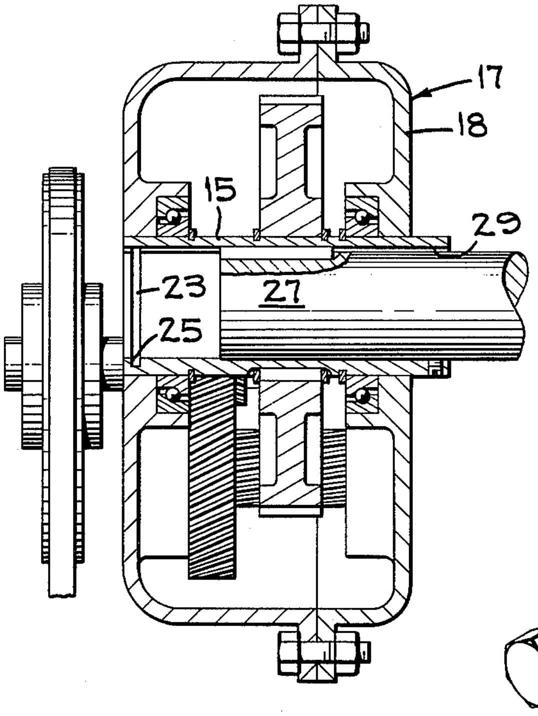
FIG_1
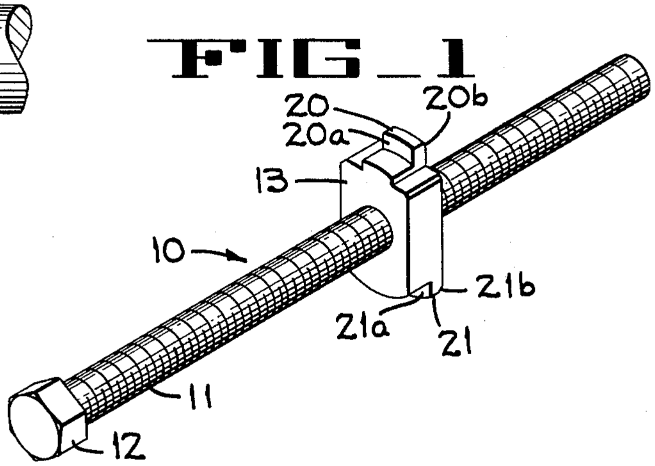
FIG_3
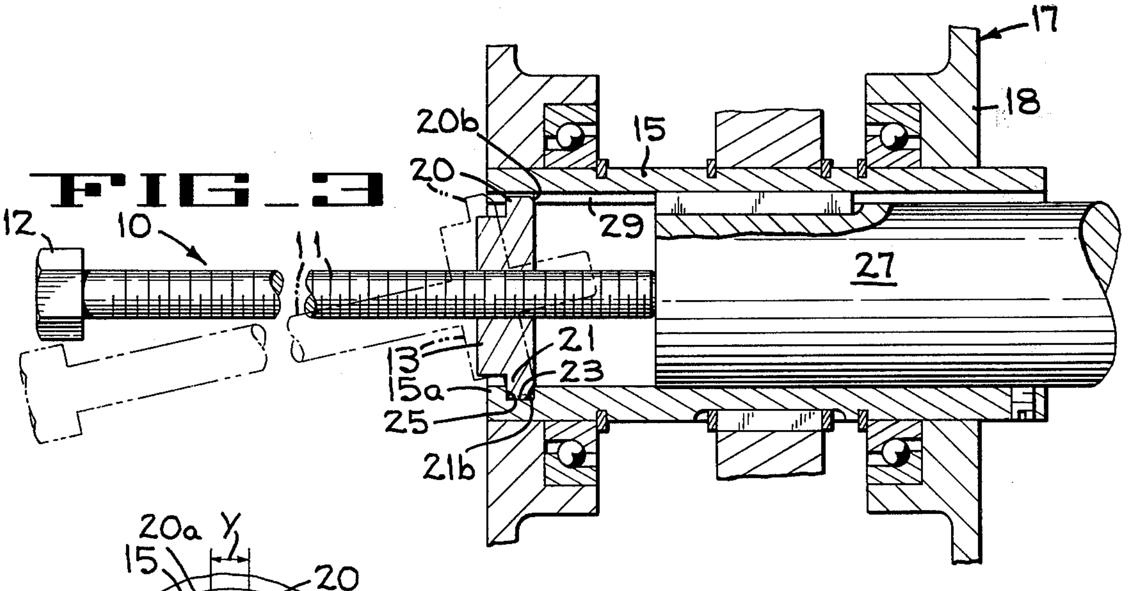
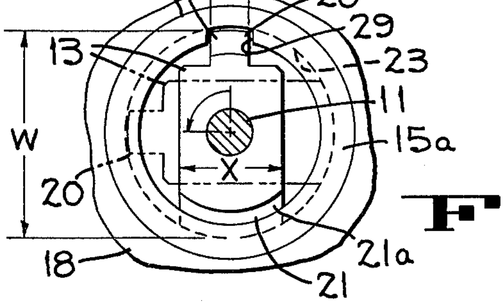
FIG_4

PULLER TOOL

BACKGROUND OF THE INVENTION

1. Field of the Invention

This invention relates to tools for servicing machinery, and more particularly concerns a device for removing a driven unit from the drive shaft to which it is keyed.

2. Description of the Prior Art

Several types of devices for removing machinery from drive shafts have been proposed. The best known of these devices are wheel pullers which typically include a central screw member for engaging the end of the shaft, and a reaction member into which the screw is threaded. The reaction member may consist of hook members or bolts or the like that are adapted to grip the wheel to be removed from the shaft so that, after the screw is threaded into the reaction member to a point where it engages the end of the shaft, continued rotation of the screw forces the wheel off the shaft.

SUMMARY OF THE INVENTION

The tool of the present invention is adapted to remove a tubular member that has an abutment, such as the wall of a groove directed inwardly of the member, from the drive shaft on which it is keyed. In one embodiment the tool comprises a puller plate threaded on a capscrew, the plate having outwardly extending flanges that are of a size and configuration such that the plate can be positioned inside a tubular sleeve with the flanges disposed in an annular groove in the sleeve. When the capscrew is threaded into the plate to a point where its inner end abuts the end of a drive shaft on which the sleeve is keyed and rotation of the screw is continued, the flanges of the puller plate react against the wall of the groove and force the sleeve off the shaft.

BRIEF DESCRIPTION OF THE DRAWINGS

FIG. 1 is a perspective of the puller tool of the present invention.

FIG. 2 is a section of a shaft mounted speed reduction unit for which the tool of FIG. 1 may be used.

FIG. 3 is an enlarged fragmentary section showing the tool of FIG. 1 in operative position during removal of the speed reduction unit from the drive shaft.

FIG. 4 is an end elevation of a portion of FIG. 3.

DESCRIPTION OF THE PREFERRED EMBODIMENT

In FIG. 1, the reference numeral 10 indicates the tool of the present invention. It comprises a threaded rod in the form of a capscrew 11 that has a hexagonal head 12 at one end. A reaction plate 13, which will hereinafter be referred to as a puller plate, is adapted to be threaded onto capscrw 11 and has a configuration adapting it for insertion in the end of a tubular drive sleeve 15 (FIG. 2) of a speed reducer unit 17. The speed reducer includes a housing 18 that rotatably journals the tubular sleeve 15 and a set of gears, one of which is keyed to sleeve 15.

As seen in FIG. 3, the puller plate 13 is adapted to be inserted in one end 15*a* of the sleeve 15 and manipulated so that a pair of arcuate flanges 20 and 21 of the plate are disposed in an annular groove 23 formed in the end of the tubular sleeve 15, with the flat rear faces 20*a* and 21*a* (FIG. 1) abutting an annular shoulder 25 formed by the groove. Then, when the rod 11 is threaded into the plate to a position where its inner end abuts the end face of a drive shaft 27 which is keyed to the sleeve 15, and the rod is further rotated in a direction tending to move the rod inwardly of the housing, the tubular drive sleeve and the rest of the speed reduction unit will be forced off the shaft 27.

In FIG. 3 it will be noted that a slot or keyway 29 is provided on the inner surface of tubular sleeve 15 at end 15*a* and that it extends inwardly of the sleeve and intersects the groove 23. As seen in FIG. 4, the width X of the puller plate 13 is considerably less than the inner diameter of the tubular drive shaft, and the width Y of the upper flange 20 is less than the width of the groove 29. The height W of the plate is greater than the inner diameter of the sleeve 15 but slightly less than the diameter of the annular groove 23. Accordingly, to insert the puller plate in the groove, the plate must be tilted as shown in phantom lines in FIG. 3 and the lower flange 21 of the plate placed in the groove. Then, the plate is pivoted clockwise (FIG. 3) to move the upper flange 20 through the slot to the full-line position of FIG. 3. To facilitate this pivoting action, the outer edges of the flanges 20 and 21 are provided with bevels 20*b* and 21*b* respectively.

After the upper flange 20 of the plate has been moved to the upright position of FIG. 3, the entire puller plate is rotated 90° about the axis of the capscrew to position the flanges 20 and 21 behind the annular shoulder 25. After the flanges are positioned in this manner, and the capscrew 11 is threaded into the plate so that its inner end engages the drive shaft 27, further rotation of the capscrew in the same direction causes the tubular sleeve 15 to be forced off the shaft 27.

From the foregoing description it will be apparent that, while the tool of the present invention is of a very simple, two-piece construction, it is uniquely adapted for removing sleeves from drive shafts. Also, it will be evident that this tool will be effective to remove any tubular member from a shaft as long as the member had abutment surfaces, such as those provided by lugs, against which the flanges of the plate can react.

I claim:

1. In a tool for removing from a shaft a sleeve that is supported thereon and has an annular internal groove spaced inwardly from an end of the sleeve and an internal slot leading from the end of the sleeve to the groove, a threaded rod adapted to be projected into the sleeve and positioned with an end in abutment with the end of the shaft, a puller plate threaded on said rod, said plate having a central body portion of generally rectangular configuration, and means defining a flange at each end of said body portion, the length of each flange measured longitudinally of said rod being less than the width of the internal groove in the sleeve, and the width of one flange being less than the width of the other and adapting said one flange to be moved through the slot to a position in alignment with the groove.

2. In combination, a shaft, a sleeve keyed on said shaft, said sleeve having an internal groove spaced from the end of said shaft, a generally rectangular plate having flanges at opposite ends disposed in the groove, said plate having a threaded opening in alignment with said shaft, and a rod having an externally threaded surface received in the opening in said plate and an end portion abutting the end of said shaft, whereby rotation of said rod in said plate in one angular direction forces said plate and said sleeve axially away from said shaft.

3. In combination, a shaft, a sleeve keyed on said shaft, said sleeve having an internal groove spaced from one end and a slot extending from said one end to said groove, a generally rectangular plate having a flange at each end disposed in the groove, one flange being of a width less than the width of the slot, means defining an internally threaded opening in said plate in alignment with said shaft, and a rod having a threaded portion received in the opening in said plate and an end portion adapted to engage the end of said shaft, whereby rotation of said rod in one direction moves said rod end into abutment with the end of said shaft and continued rotation moves the puller plate and said sleeve axially relative to said shaft.

* * * * *